March 3, 1931. W. L. MORELAND 1,794,707
MOTOR VEHICLE
Filed June 14, 1927   2 Sheets-Sheet 2

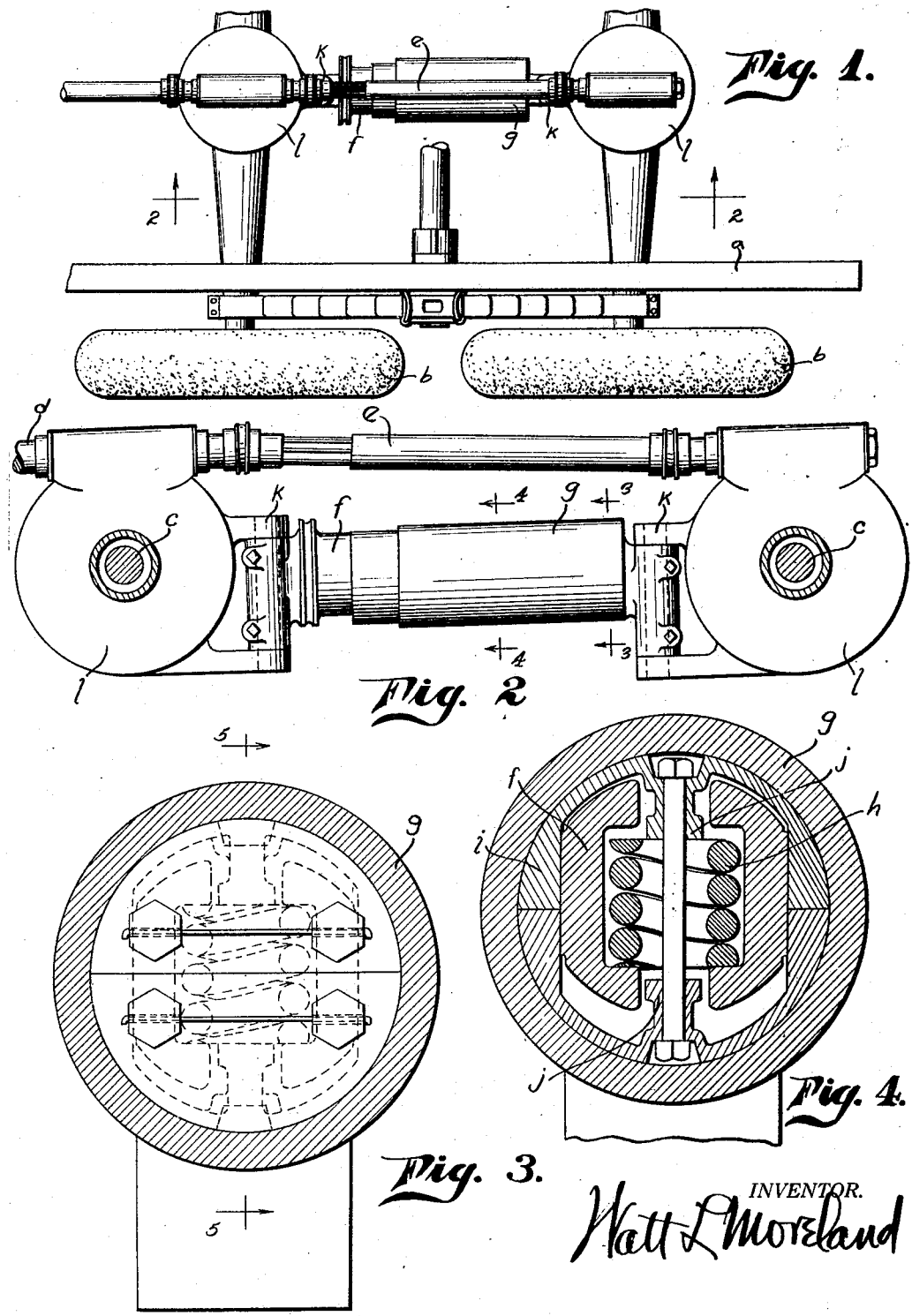

INVENTOR.

Patented Mar. 3, 1931

1,794,707

UNITED STATES PATENT OFFICE

WATT L. MORELAND, OF LOS ANGELES, CALIFORNIA, ASSIGNOR TO MORELAND MOTOR TRUCK COMPANY, OF BURBANK, CALIFORNIA

MOTOR VEHICLE

Application filed June 14, 1927. Serial No. 198,820.

My invention relates to six-wheel motor vehicles of the type described in my pending patent application, Serial No. 75,408, now Patent No. 1,743,373, dated Jan. 14, 1930, and has for its object a torque neutralizing member which permits slight motion in all directions between the two rear axles.

In carrying my invention into practice, I use a tubular torque member of two main parts, one concentric within the other, which permits slight vertical motion between said two main parts to give more flexibility to the drive. Both these parts are in pivotal connection with the axle housings to permit horizontal motion between said housings and the torque member.

Figure 5:
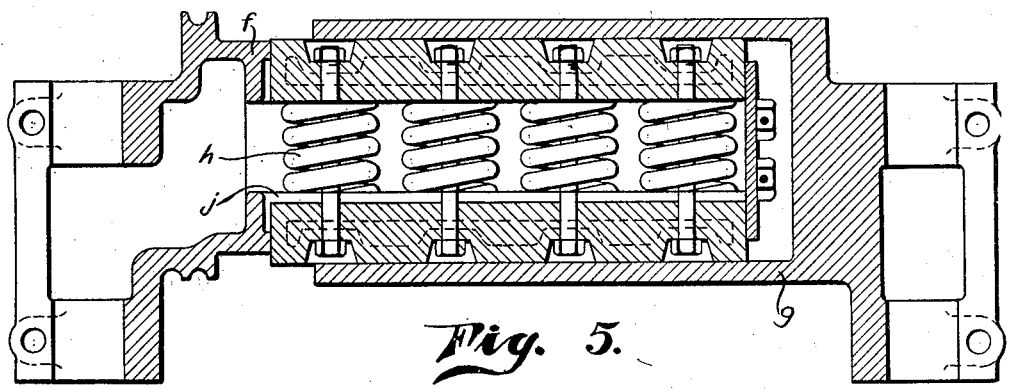
Figure 6:
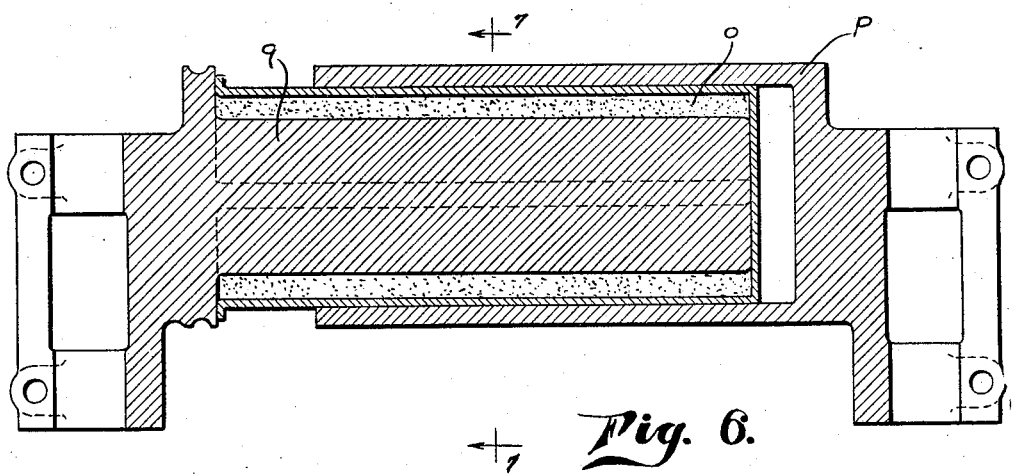
Figure 7:
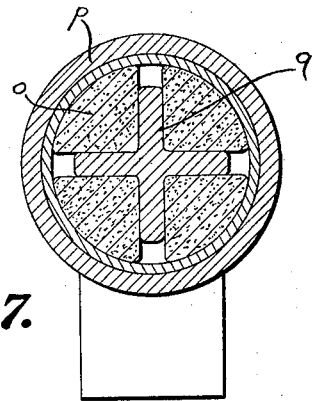

In the drawings forming part of this specification, Fig. 1 shows a plan view of a portion of a six-wheel motor vehicle; Fig. 2 a side elevation of the two rear axles and the torque member on line 2—2 of Fig. 1; Fig. 3 a sectional view through the torque member on line 3—3 of Fig. 2; Fig. 4 a sectional view through the torque member on line 4—4; Fig. 5 a longitudinal section through the torque member on line 5—5 of Fig. 3; Fig. 6 shows a modified form of torque member forming a part of this invention and Fig. 7 a sectional view through 7—7 of Fig. 6.

In my invention, the torque reaction in one of the rear axle housings is neutralized by the other axle housing but in order to give a certain amount of flexibility to the drive I provide a certain amount of give or cushion between the two parts of the torque member.

In the drawings, like letters represent like parts throughout the various views. $a$ represents the side member of the motor vehicle frame; $b$ the four rear wheels (only two being shown); $c$ the two rear line axles, both being driven from the engine through propeller shaft $d$; shaft $e$ transmits the drive from one rear axle to the other. $r$ is a spring, the center of which is attached to the frame, while the two ends are pivotally connected to the axle housings $l$. When the motor vehicle is in operation, the driving torque is resisted or neutralized by the torque member which is composed of two parts, $f$ and $g$, $f$ being the male part which is in sliding connection with $g$.

I found that by allowing a certain amount of "give" between $f$ and $g$ I obtain a more flexible drive and a smoother operating vehicle. For this purpose I provide coil springs $h$ within the torque member. The springs are under great tension when in their normal position so that the end of the springs press against the ends $j$ of spring container $i$. Part $f$ of the torque member is recessed as shown in Fig. 4, to accommodate the springs and spring container $i$, and, normally, when the force of the torque reaction is no greater than the tension of the springs $h$, the springs will hold said part $f$ in a central or concentric position with respect to $g$. When, however, the force of the torque reaction in any one of the axles is greater than the total spring pressure, then there will be a displacement between $f$ and $g$, as shown in Fig. 4, where the two parts have assumed an eccentric position. Part $f$ is shown displaced upward with respect to $g$.

At $k$ are shown pivotal connections between axle housings $l$ and torque members $f$ and $g$, to permit a horizontal angular movement between said axle housings and the torque member. This I found advantageous for when the rear wheels on one side should come closer together than on the other side, as will sometimes occur when the vehicle travels over uneven roads, there would be a slight motion between the axle housings and the torque members around pivot $k$.

Fig. 6 shows a modification of my invention, where, instead of springs, I employ a rubber core $o$ which normally holds the two parts $p$ and $q$ of the torque member concentric with each other. In the event of the force of the torque reaction increasing the upper half or lower half of the core would be compressed to a greater extent and there would be a slight vertical displacement between $p$ and $q$.

Having now described my invention, what I claim as new and desire to protect by Letters Patent is:

1. In a vehicle, a plurality of live axles, housings for said axles, a torque neutralizing member between said axle housings composed of two cylindrical parts in telescopic sliding relation with regard to each other, springs under great initial tension located transversely wihin the cylindrical parts to hold said parts concentrically with respect to each other under normal operation of the vehicle.

2. In a vehicle chassis, a plurality of live axles, housings for said axles, a torque neutralizing member between said axle housings composed of two cylindrical parts in telescopic sliding relation with regard to each other, transverse cushioning means between the cylindrical parts held in position by a third part placed between the sliding surfaces.

3. In a vehicle chassis, a plurality of live axles, housings for said axles, a torque neutralizing member between said axle housings composed of two cylindrical parts in telescopic sliding relation with regard to each other, cushioning means beween the sliding surfaces to permit vertical give between the two cylindrical parts, means for permitting horizontal oscillation between the axle housings and the torque member.

4. In a motor vehicle, a plurality of axle housings, a torque neutralizing member between said housings, said member composed of two main cylindrical parts in telescopic sliding relation with each other, cushioning means to permit transverse give between the two main parts attached to a third part, said third part in sliding contact with one of the main parts and held in place by the other main part.

WATT L. MORELAND.